W. C. HEARD.
SAWMILL CARRIAGE TRACK.
APPLICATION FILED DEC. 14, 1916.
1,218,180.
Patented Mar. 6, 1917.
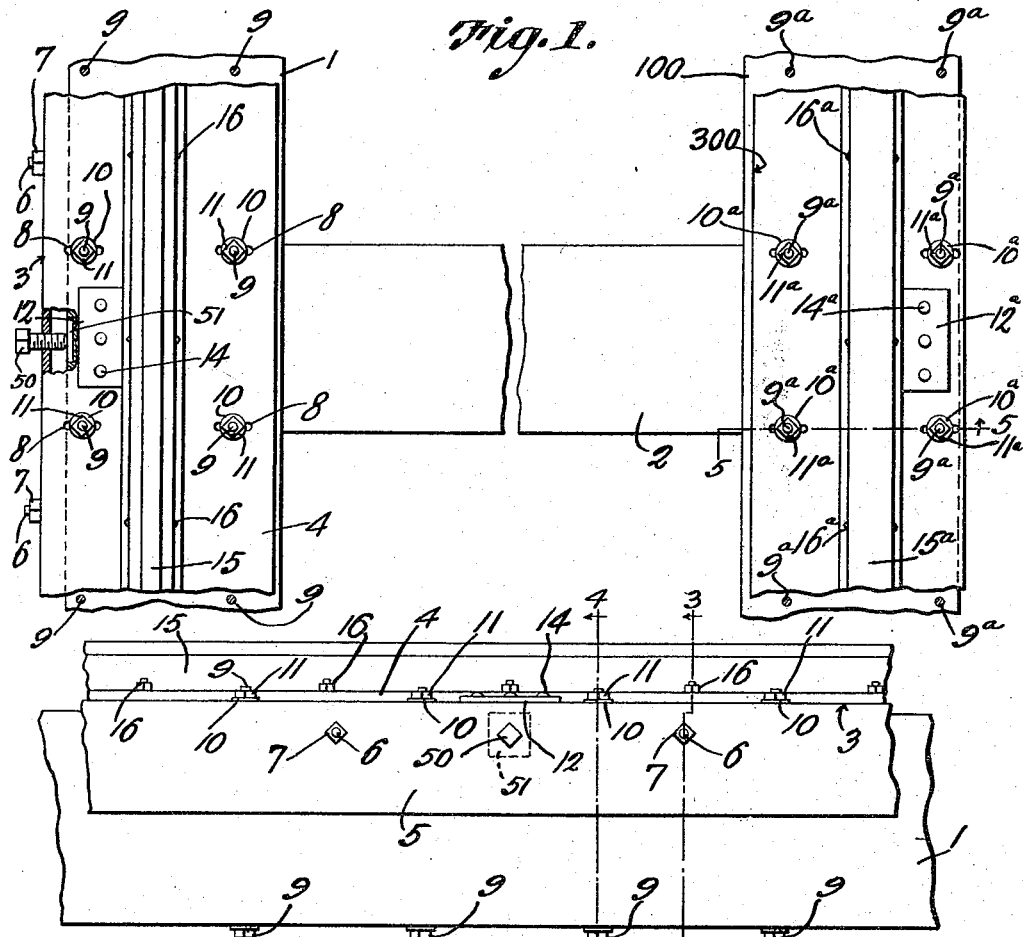
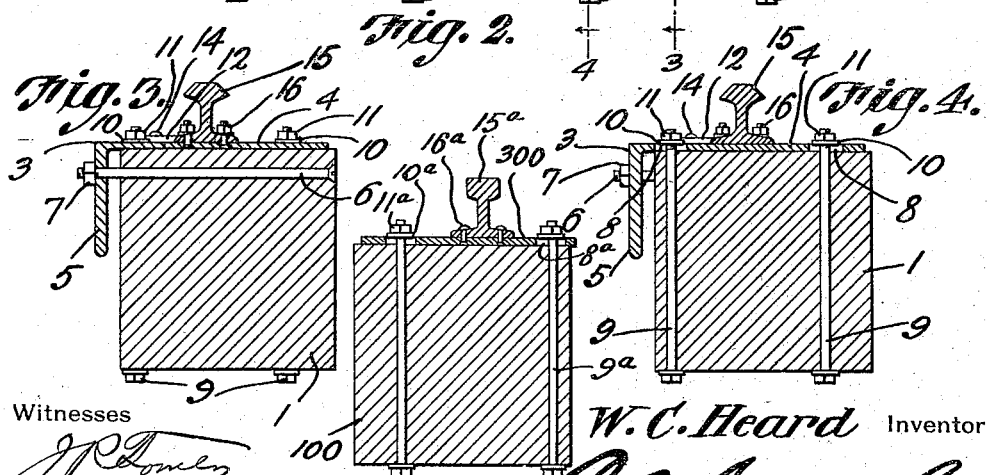
Witnesses
W. C. Heard  Inventor
by  Attorneys

UNITED STATES PATENT OFFICE.

WILLIAM C. HEARD, OF HEMPHILL, TEXAS.

SAWMILL-CARRIAGE TRACK.

1,218,180.   Specification of Letters Patent.   Patented Mar. 6, 1917.

Application filed December 14, 1916. Serial No. 136,978.

*To all whom it may concern:*

Be it known that I, WILLIAM C. HEARD, a citizen of the United States, residing at Hemphill, in the county of Sabine and State of Texas, have invented a new and useful Sawmill-Carriage Track, of which the following is a specification.

By way of explanation, it may be stated that when logs or timbers are rolled onto the log carriage of a saw mill, the timbers exert a constant tendency to crowd the tracks on which the saw mill carriage moves, laterally and out of line. As a consequence of this irregularity in the tracks, imperfect timber is produced by the saw, in a manner which will be thoroughly understood by those skilled in the art.

In view of the foregoing, the present invention aims to provide novel means whereby the tracks on which the saw mill carriage moves, may be lined up rapidly and with a minimum amount of work, means being provided whereby the tracks will be held in place after alinement.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in top plan, a portion of a saw mill track embodying the present improvements, parts being broken away;

Fig. 2 is a side elevation of one of the rails shown in Fig. 1;

Fig. 3 is a cross section on the line 3—3 of Fig. 2;

Fig. 4 is a cross section on the line 4—4 of Fig. 2; and

Fig. 5 is a cross section on the line 5—5 of Fig. 1.

In the drawings, the numerals 1 and 100 denote stringers carried by cross beams 2 or in any other suitable manner. The numeral 3 denotes an angle member which coöperates with the stringer 1. The angle member 3 includes a horizontal flange 4 resting slidably on the top of the stringer 1, and a vertical flange 5, which depends at one side of the stringer, the flange 5 being spaced horizontally from the outer side face of the stringer, as clearly illustrated in Figs. 3 and 4. Bolts 9 or other securing elements pass upwardly through the stringer 1 and through elongated slots 8 formed in the horizontal flange 4 of the angle member 3. The bolts 9 carry washers 10 and nuts 11, coacting with the horizontal flange of the angle member 3. Mounted transversely in the stringer 1 are bolts 6 or the like, the bolts passing through the vertical flange 5 of the angle member 3, and carrying nuts 7 which coact with said flanges. Braces 12 may be mounted at suitable distances apart on the horizontal flange 4 of the angle member 3, the braces 12 being held in place by securing elements 14 of any desired kind. Superposed on the flange 4 of the angle member 3 is a rail 15 held in place by bolt and nut structures 16, the lower ends of the bolts being counter-sunk into the lower face of the horizontal flange 4, so that the flange 4 may slide readily on the upper surface of the stringer 1, transversely thereof. The rail 15 is remote from the sawing mechanism, the same being located outside of the stringer 100. The edges of the ball of rail 15 preferably are beveled, as indicated in Figs. 3 and 4. Set screws 50 may be threaded into the vertical flange 5 of the angle member 3, the inner ends of the set screws 50 bearing against stop plates 51 mounted on the outer side of the stringer 1.

In practical operation, the braces 12 prevent the rail 15 from moving outwardly and straining the bolt and nut structures 16 unduly. Should the track rail 15 get out of line, the nuts 11 are loosened, so that the horizontal flanges 4 of the angle members 3 may slide crosswise of the stringers 1. Then, the nuts 7 on the bolts 6 are tightened up, and these nuts, coacting with the vertical flanges 5 of the angle member 3, will move the angle member and the track rail 15 transversely of the stringer 1, inwardly toward the stringer 100, thus lining up the tracks. When the desired adjustment has been effected, the nuts 11 may be tightened down, so as to hold the angle member 3 and the track 15 in adjusted positions. Should it occur that the angle member 3 is drawn inwardly too far, by tightening up the nuts 7, then the angle member may be backed off, away from the stringer 1, by manipulating the set screws 50. These set screws 50, further, limit positively the inward movement of the angle member 3, when the same is advanced by tightening up the nuts 7.

In connection with the stringer 100, which is adjacent the sawing mechanism, the structure above described is duplicated in many particulars, saving for the fact that the angle member 3 is duplicated by a flat plate 300 having no flange corresponding to the flange 5 of the angle member 3. The plate or strip 300 supports a rail 15$^a$, which is like the rail 15, saving for the fact that the lateral edges of the rail 15 are not beveled. The rail 15$^a$ is secured to the plate or strip 300 by means of rivets 16$^a$. In connection with the stringer 100, the plate or strip 300 and the rail 15$^a$, many parts hereinbefore described are used, these parts being designated by numerals hereinbefore employed, with the suffix "a".

The construction of the device herein disclosed is such that, after a saw mill carriage track has moved out of alinement after the repeated thrusts exerted on the carriage by the logs or timbers as the latter are mounted on the carriage, the tracks may be lined up readily. As a matter of experiment, one man in an hour or less can line up a stretch of track, the alinement of which hitherto has required the effort of two men, for a day, in the absence of such a structure as that disclosed in this application.

Having thus described the invention, what is claimed is:—

1. In a saw mill carriage track, a stringer; an angle member including a horizontal flange located on top of the stringer, and a vertical flange located at one side of the stringer; a rail carried by the horizontal flange; means coacting with the stringer and the vertical flange for moving the angle member transversely of the stringer; and means coacting with the horizontal flange and the stringer for holding the angle member in adjusted positions transversely of the stringer.

2. In a saw mill carriage track, a stringer; an angle member comprising a horizontal flange located on top of the stringer, and a vertical flange depending at one side of the stringer, the horizontal flange having a slot elongated transversely of the stringer; a track rail carried by the horizontal flange of the angle member; a bolt assembled with the stringer and operating in the slot; a nut on the bolt coacting with the horizontal flange of the angle member; a second bolt assembled with the stringer and passing through the vertical flange of the angle member; and a nut on the second bolt and coacting with the vertical flange of the angle member.

3. In a saw mill carriage track, a stringer; an angle member comprising a horizontal flange located on top of the stringer, and a vertical flange depending at one side of the stringer; a draw bolt connecting the vertical flange with the stringer; and a thrust-screw threaded into the vertical flange of the angle member and engaging the stringer; and a track rail carried by the horizontal flange of the angle member.

4. In a saw mill carriage track, a stringer; an angle member comprising a horizontal flange located on top of the stringer, and a vertical flange depending at one side of the stringer; a tension means connecting the vertical flange with the stringer; a thrust means carried by the vertical flange and coacting with the stringer; a connecting means uniting the horizontal flange with the stringer and having a limited lost motion connection with the horizontal flange, whereby the angle member may be moved in one direction by the tension means, and be moved in an opposite direction by the thrust means; and a rail carried by the horizontal flange and the angle member.

In testimony that I claim the foregoing as my own, I have hereto affixed my signature in the presence of two witnesses.

WILLIAM C. HEARD.

Witnesses:
L. E. KING,
C. N. WILLIAMS.

Copies of this patent may be obtained for five cents each, by addressing the "Commissioner of Patents, Washington, D. C."